(12) United States Patent
Sutter et al.

(10) Patent No.: US 12,655,357 B2
(45) Date of Patent: Jun. 16, 2026

(54) METHOD FOR PRODUCING RESINS FROM RUBBER CHIPS

(71) Applicant: COMPAGNIE GENERALE DES ETABLISSEMENTS MICHELIN, Clermont-Ferrand (FR)

(72) Inventors: Marc Sutter, Clermont-Ferrand (FR); Pedro Borges, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 312 days.

(21) Appl. No.: 18/037,002

(22) PCT Filed: Oct. 15, 2021

(86) PCT No.: PCT/FR2021/051795
§ 371 (c)(1),
(2) Date: May 15, 2023

(87) PCT Pub. No.: WO2022/101563
PCT Pub. Date: May 19, 2022

(65) Prior Publication Data
US 2023/0407184 A1 Dec. 21, 2023

(30) Foreign Application Priority Data
Nov. 16, 2020 (FR) ...................................... 2011697

(51) Int. Cl.
*C10G 1/10* (2006.01)
*C08F 6/12* (2006.01)
(Continued)

(52) U.S. Cl.
CPC .................. *C10G 1/10* (2013.01); *C08F 6/12* (2013.01); *C08F 36/02* (2013.01); *C10B 53/07* (2013.01); *C10G 1/002* (2013.01)

(58) Field of Classification Search
None
See application file for complete search history.

(56) References Cited

U.S. PATENT DOCUMENTS 2,471,134 A * 5/1949 Wright ................... B01D 3/141
196/100
3,880,807 A 4/1975 Wakefield et al.
(Continued)

FOREIGN PATENT DOCUMENTS

EP 0928817 A1 7/1999
JP 2017-8214 A 1/2017
(Continued)

OTHER PUBLICATIONS

H. Pakdel, et al., "Production of dl-limonene by vacuum pyrolysis of used tires", J. Analytical and Appl. Pyrolysis 57 (2001) 91-107.
(Continued)

*Primary Examiner* — In Suk C Bullock
*Assistant Examiner* — Alyssa L Cepluch
(74) *Attorney, Agent, or Firm* — VENABLE LLP

(57) ABSTRACT
A method of production of hydrocarbon-containing resins starting from a charge comprising rubber chips comprises at least one pyrolysis step and a resin synthesis step.

13 Claims, 1 Drawing Sheet

(51) Int. Cl.
*C08F 36/02* (2006.01)
*C10B 53/07* (2006.01)
*C10G 1/00* (2006.01)

(56) References Cited

U.S. PATENT DOCUMENTS

| | | | | |
|---|---|---|---|---|
| 5,087,436 A | * | 2/1992 | Roy | C09C 1/482 |
| | | | | 423/449.1 |
| 5,854,367 A | * | 12/1998 | Salvetat | C08F 12/04 |
| | | | | 526/221 |
| 2019/0300794 A1 | * | 10/2019 | Drennan | C10B 57/14 |
| 2024/0018332 A1 | | 1/2024 | Sutter et al. | |

FOREIGN PATENT DOCUMENTS

| | | | |
|---|---|---|---|
| WO | 90/14409 A1 | 11/1990 | |
| WO | 2013/170358 A1 | 11/2013 | |

OTHER PUBLICATIONS

International Search Report dated Jan. 26, 2022, in corresponding PCT/FR2021/051795 (6 pages).

F. Cataldo, "Thermal depolymerization and pyrolysis of cis-1,4-polyisoprene: preparation of liquid polyisoprene and terpene resin", J. Analytical and Appl. Pyrolysis, vol. 44, No. 2, pp. 121-130 (1998).

B. Danon, et al., "A review of dipentene (DL-limonene) production from waste tire pyrolysis", J. Analytical and Appl. Pyrolysis, vol. 112, pp. 1-13 (2015).

G. Crane, et al., "Hydrocarbon Tackifying Resins Ex Scrap Tires", J. Elastomers and Plastics, vol. 7, No. 4, pp. 372-379 (1975).

* cited by examiner

[Fig 1]
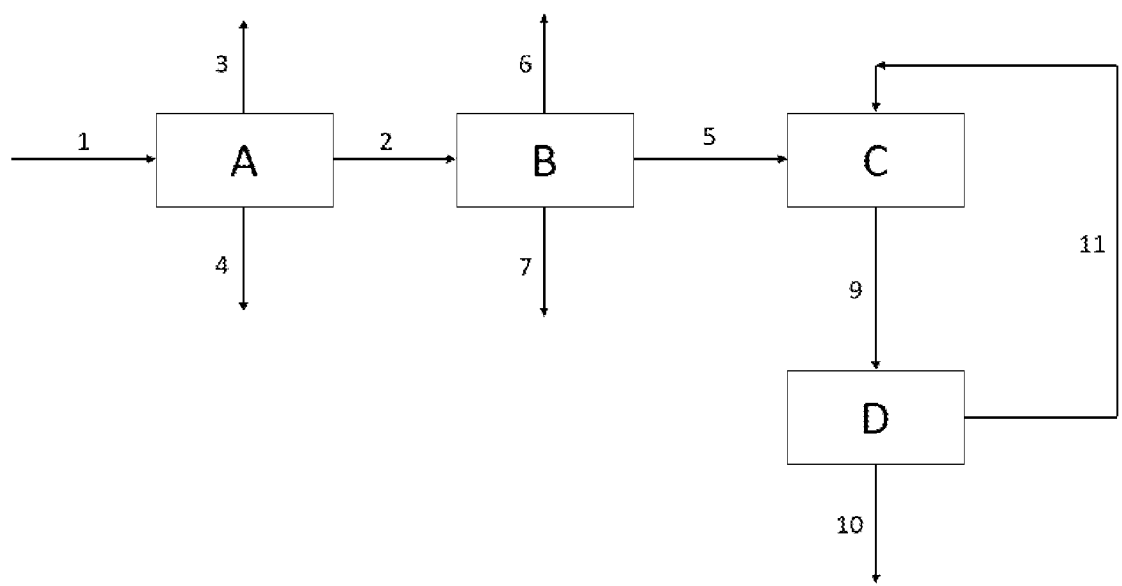
[Fig 2]
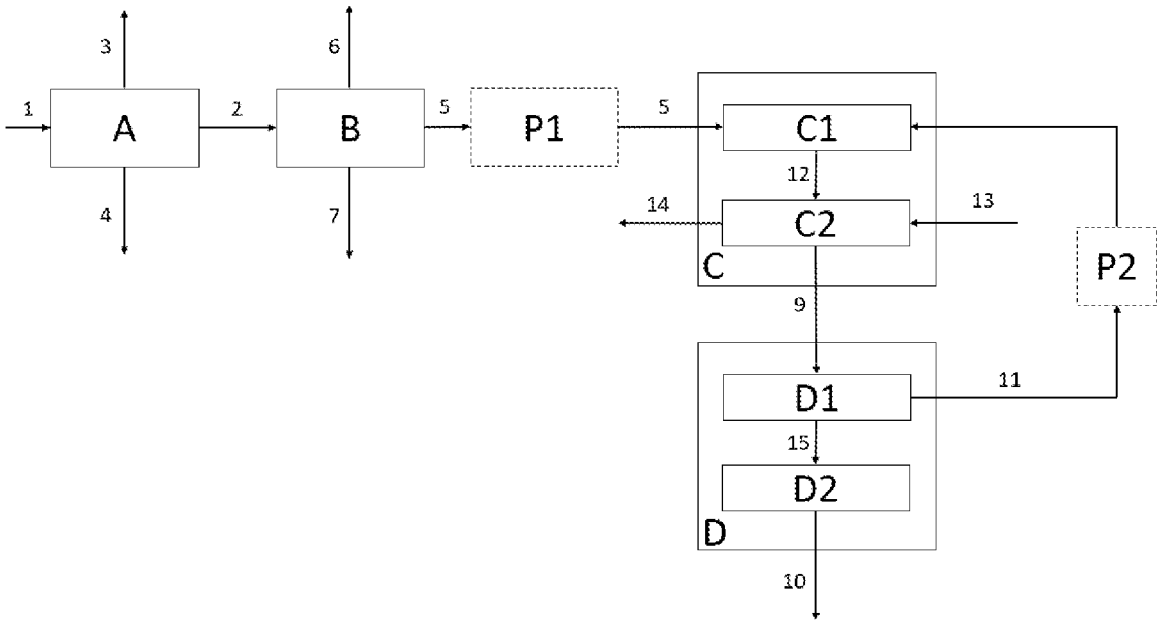

METHOD FOR PRODUCING RESINS FROM RUBBER CHIPS

TECHNICAL FIELD OF THE INVENTION

The present invention relates to the field of methods of recycling rubber articles.

PRIOR ART

Pneumatic tyres, and more generally articles made of rubber such as for example conveyor belts and non-pneumatic tyres, are complex objects consisting of a plurality of components. As an example, a pneumatic tyre consists of more than 200 different raw materials.

The challenges in terms of pressure on renewable and fossil resources are such that it is essential to make the best possible use of the resources represented by used articles made of rubber. Now, the recycling of the materials obtained from used rubber articles, such as used tyres into new tyres, is still limited, in particular because of the major impact of the constituents on tyre performance. In fact, recycling of materials may have a negative overall environmental impact owing to the degradation of the performance of tyres using these materials. There is therefore a great need for methods for recycling rubber articles at the end of their life in order to produce raw materials whose use will not degrade tyre performance, thus leading to a lower overall environmental impact.

Much research has been undertaken in this field, in particular on the recycling of oils resulting from the pyrolysis of used tyre waste. Thus, documents EP 0928817, WO 2013/170358 and JP2017/008214 teach the production of tyre grade carbon black starting from the pyrolysis of tyre chips.

Other research examines the recycling of intermediates. Document WO 90/14409 relates to the separation of pyrolysis oils from used tyre waste by distillation in order to recover marketable chemicals, in particular limonene, distillation being carried out so as to concentrate the species of commercial interest. The article "*Production of dl-limonene by vacuum pyrolysis of used tires*" for its part teaches that the amount of limonene in the pyrolysis oils from tyre chips can be increased by adjusting the temperature of the pyrolysis step and minimizing the residence time of the vapour phase in the reactor.

The document "A review of dipentene (dl-limonene) production from waste tire pyrolysis" (Danon et al. Journal of Analytical and Applied Pyrolysis 112 (2015) 1-13) also deals with the production of dipentene starting from tyre waste. None of these documents deals with the subsequent use of these products. The document "Thermal depolymerization and pyrolysis of cis-1,4-polyisoprene: preparation of liquid polyisoprene and terpene resin" (Cataldo, Journal of Analytical and Applied Pyrolysis 44(1998) 121-130) deals with the production of resins starting from the product of depolymerization of natural or synthetic pure isoprene. However, the depolymerization of tyre waste leads to many by-products that are not present in the depolymerization of pure polyisoprene, whose effect is potentially harmful to the production of resins.

An aim of the present invention is to recycle the rubber chips obtained from articles at the end of their life in order to produce raw materials, in particular resins, that may be used in the manufacture of new tyres without this affecting their performance.

DETAILED DESCRIPTION OF THE INVENTION

The invention relates to at least one of the following implementations:

1. Method of production of hydrocarbon-containing resins starting from a charge comprising rubber chips, said method comprising at least:
a. A step of pyrolysis of the rubber chips carried out at a temperature between 300 and 900° C. with an increasing temperature ramp, giving a gaseous effluent, a pyrolysis oil and a solid effluent, said pyrolysis oil comprising at least 1.5 wt % of $C_4$-$C_{12}$ olefinic monomers;
b. A step of separation of the pyrolysis oil into at least one raffinate, an intermediate fraction and an extract, the intermediate fraction comprising from 10 to 90 wt % of $C_4$-$C_{12}$ olefinic monomers and at most 10 wt % of heteroatoms;
c. A resin synthesis step comprising a polymerization section supplied at least with the intermediate fraction resulting from step b), followed by a finishing section producing a polymerized effluent;
d. A step of treatment of the polymerized effluent resulting from step c) comprising a section for separation of an effluent rich in inert compounds and an effluent rich in resins, and a drying section supplied with the resin-rich effluent in order to produce a stream of hydrocarbon-containing resins;
the method of production of hydrocarbon-containing resins not being supplied with any external feed of inert compounds, inert compounds being understood as not being incorporated in the resin and not interacting with the catalytic system in step c) of resin synthesis.

2. Method according to the preceding embodiment, in which the rubber chips have a greatest length in the range from 1 to 100 mm, preferably from 1 to 50 mm and preferably from 1 to 30 mm.

3. Method according to any one of the preceding embodiments, in which the rubber chips comprise at least 50 phr of diene elastomer.

4. Method according to the preceding embodiment, in which the diene elastomer is selected from the group consisting of natural rubber, synthetic polyisoprenes, polybutadienes, butadiene copolymers, isoprene copolymers and mixtures of these elastomers.

5. Method according to any one of the preceding embodiments, in which the rubber chips are from tyre treads.

6. Method according to any one of the preceding embodiments, in which the pyrolysis step comprises a pyrolysis reactor operated at a temperature between 350 and 800° C. and preferably between 350 and 650° C., a pressure below 1 bar and a ratio of the residence time of the solid to the residence time of the gas from 10 to 240, preferably from 10 to 120 and very preferably from 10 to 60.

7. Method according to any one of the preceding embodiments, in which the pyrolysis step is supplied with a stream of inert gases.

8. Method according to any one of the preceding embodiments, in which the residence time in the solid fraction in the pyrolysis step ranges from 3 to 180 min, preferably from 3 to 120 min.

9. Method according to any one of the preceding embodiments, in which the pyrolysis step is carried out with an increasing temperature ramp between 1 and 10° C./min.

10. Method according to any one of the preceding embodiments, in which the intermediate fraction resulting from step b) is a cut whose boiling point at atmospheric pressure ranges from 140 to 280° C., preferably from 150 to 280° C. and preferably from 150 to 260° C.

11. Method according to any one of the preceding embodiments, in which the intermediate fraction resulting from step b) comprises at most 2 wt %, preferably at most 1.5 wt % and preferably less than 1 wt %, very preferably less than 0.8 wt % of sulphur element.

12. Method according to any one of the preceding embodiments, in which the separation step b) is carried out by distillation.

13. Method according to the preceding embodiment, in which the intermediate fraction is obtained by topping followed by tailing.

14. Method according to embodiment 12 in which the separation step b) is carried out in a column with an internal wall, the intermediate fraction being obtained by side-stream draw-off from said column.

15. Method according to one of embodiments 12 to 14 in which step b) is carried out at a pressure less than or equal to atmospheric pressure, preferably less than or equal to 0.5 bar, preferably less than or equal to 0.250 bar.

16. Method according to any one of the preceding embodiments, in which the intermediate fraction resulting from step b) undergoes a purification treatment before supply to step c).

17. Method according to the preceding embodiment, in which the purification treatment is carried out by passing the intermediate fraction over a fixed bed of silica, alumina, activated carbon, ion-exchange resins or a mixture of these constituents.

18. Method according to one of the two preceding embodiments in which the content of heteroatoms in the intermediate fraction at the end of the purification treatment is below 2 wt %, preferably below 1 wt %, preferably below 0.9 wt % and preferably below 0.8 wt %.

19. Method according to any one of the preceding embodiments, in which the polymerization section is operated in the presence of an acid catalyst, preferably selected from a catalyst of the Brönsted acid or Lewis acid type, preferably a Lewis acid comprising ligands of the aluminium halide family.

20. Method according to any one of the preceding embodiments, in which the polymerization section is operated at a temperature from −60° C. to 120° C., preferably from −50° C. to 100° C., and preferably from −40° C. to 90° C.

21. Method according to any one of the preceding embodiments, in which the average residence time in the polymerization section is between 0.25 h and 6 h.

22. Method according to any one of the preceding embodiments, in which the finishing section of step c) is carried out by being brought into contact with a stream comprising a stopper compound selected from water, a $C_1$-$C_3$ alcohol and mixtures thereof, preferably selected from water, methanol, ethanol and mixtures thereof, very preferably water, at a temperature between 5 and 80° C., followed by separation by phase decanting of a polymerized effluent and an effluent comprising predominantly the stopper compound.

23. Method according to the preceding embodiment when it depends on embodiment 19, or according to the preceding embodiment when it depends on embodiment 19 and on any one of embodiments 20 to 21 in which the molar ratio of stopper compound to polymerization catalyst in the finishing section is at least equal to 2.

24. Method according to one of the two preceding embodiments in which the stream from the polymerization section and the stream comprising the stopper compound are brought into contact with stirring for a time preferably ranging from 5 min to 2 h, preferably from 15 min to 45 min.

25. Method according to one of the three preceding embodiments in which separation by phase decanting is carried out for a time from 5 min to 4 h.

26. Method according to any one of the preceding embodiments, in which the separation section of the step of treatment of the polymerized effluent is carried out by distillation, coagulation of the resins, liquid-liquid extraction or a combination of these methods.

27. Finished or semi-finished rubber article comprising a resin obtained by the method according to any one of the preceding embodiments.

28. Pneumatic or non-pneumatic tyre comprising a resin obtained by the method according to any one of embodiments 1 to 26.

Definitions

The compounds comprising carbon mentioned in the description may be of fossil origin or biosourced. In the latter case, they may be derived partially or wholly from biomass or obtained from renewable raw materials derived from biomass.

$C_n$ compound means a compound comprising n carbon atoms. Similarly, $C_n$-$C_m$ compounds means a set of compounds comprising from n to m carbon atoms.

Heteroatom means an atom other than carbon or hydrogen, for example nitrogen, sulphur, oxygen.

Charge Used for the Method

The method of production according to the invention is supplied with a charge comprising rubber chips.

"Chip" means a small element obtained by cutting up articles made of rubber, preferably used rubber articles. Non-rubber constituents, such as for example textile fibres or metal wires, are preferably removed from the rubber articles. The rubber chips preferably have a greatest length from 1 to 100 mm, preferably from 1 to 50 mm and preferably from 1 to 30 mm. The chips may be of any shape, but chips of relatively uniform size and shape will be preferred to facilitate carrying out of the pyrolysis step. This control of size and shape is familiar to a person skilled in the art.

Preferably, the rubber chips comprise at least 50 phr of diene elastomer. "Diene" elastomer (or vaguely rubber), whether natural or synthetic, means per se an elastomer made up at least partly (i.e. a homopolymer or a copolymer) of diene monomer units (monomers bearing two carbon-carbon double bonds, conjugated or unconjugated).

Preferably, the diene elastomer is selected from the group consisting of polybutadienes (BR), natural rubber (NR), synthetic polyisoprenes (IR), butadiene copolymers, isoprene copolymers, and mixtures of these elastomers. The butadiene copolymers are in particular selected from the group consisting of the butadiene-styrene copolymers (SBR).

Preferably, the diene elastomer is an isoprene elastomer.

"Isoprene elastomer" means in a known manner a homopolymer or a copolymer of isoprene, in other words a diene elastomer selected from the group consisting of natural rubber (NR), synthetic polyisoprenes (IR), various isoprene copolymers and mixtures of these elastomers. Among the isoprene copolymers, we may mention in particular the isobutene-isoprene copolymers (butyl rubber—IIR), isoprene-styrene (SIR), isoprene-butadiene (BIR) or isoprene-butadiene-styrene (SBIR). This isoprene elastomer is preferably selected from the group consisting of natural rubber, synthetic cis-1,4 polyisoprenes and mixtures thereof; among these synthetic polyisoprenes, polyisoprenes having a level (mol %) of cis-1,4 bonds greater than 90%, even more preferably greater than 98%, are preferably used. Preferably and according to any one of the arrangements in the present document, the diene elastomer is natural rubber.

A high content of diene elastomer favours the production of monomers of interest following pyrolysis, in particular of limonene.

Preferably, the rubber chips are obtained from tyre treads, in particular from treads of tyres of heavy goods vehicles, the latter having high contents of diene elastomers, preferably isoprene elastomers, typically from 60 to 100 phr of isoprene elastomers.

Pyrolysis Step a)

The charge comprising rubber chips is fed to a step of pyrolysis of the rubber chips carried out at a temperature between 300 and 900° C. with an increasing temperature ramp, giving a gaseous effluent, a pyrolysis oil and a solid effluent, said pyrolysis oil comprising at least 1.5 wt % of $C_4$-$C_{12}$ olefinic monomers.

The pyrolysis step is preferably carried out at a temperature between 350 and 800° C., and preferably between 350 and 650° C., a pressure below 1 bar and a ratio of the residence time of the solid to the residence time of the gas from 10 to 240, preferably from 10 to 120 and very preferably from 10 to 60.

A short residence time of the gas fraction relative to the residence time of the solid fraction makes it possible to improve the yield of monomers of interest. The residence time of the gas fraction may be decreased by feeding the pyrolysis step with an inert gas. This preferred feed also makes it possible to improve the desorption of the volatile substances bound to the solid fraction.

The residence time of the solid fraction in the pyrolysis step preferably ranges from 3 to 180 min, preferably from 3 to 120 min. The residence time of the gas fraction is less than 3 min.

These particular conditions make it possible to maximize the production of compounds of interest, in particular of monomers such as limonene, as well as of gaseous fractions marketable as fuels and of heavy liquid fractions usable for the manufacture of carbon black.

In particular, the use of an increasing temperature ramp makes it possible to optimize the yield and the selectivity of the pyrolysis reactions for the monomers of interest. Preferably, the pyrolysis step is carried out with a temperature ramp between 1 and 10° C./min.

The pyrolysis step may be carried out in a pyrolysis reactor, and may be operated continuously, semi-continuously or as a batch process. Reactors of this kind are familiar to a person skilled in the art.

When the pyrolysis step is conducted continuously or semi-continuously, it may carried out in several zones operating at increasing temperatures so that the stream passing through these zones undergoes a temperature rise between 1 and 10° C./min.

The effluent from pyrolysis is cooled in order to condense the volatile fractions. At the end of condensation, three effluents are obtained: a gaseous effluent comprising the non-condensable gases (i.e. gaseous in normal temperature and pressure conditions, namely 0° C. and 1 atm), a liquid effluent designated by the term "pyrolysis oil", and a solid effluent.

The pyrolysis oil consists mainly of a mixture of hydrocarbons with a wide range of boiling points. The majority of these compounds form part of the family of the alkanes, olefins, naphthenes (cycloalkanes) and aromatics. Certain species containing heteroatoms are also present.

The operating conditions of the pyrolysis step of the method according to the invention give a pyrolysis oil comprising at least 1.5 wt % of $C_4$-$C_{12}$ olefinic monomers, preferably at least 2 wt % of $C_4$-$C_{12}$ olefinic monomers, preferably at least 4 wt %.

"Olefinic monomers" means hydrocarbon-containing compounds that comprise unsaturated carbon-carbon bonds and are polymerizable in suitable conditions. Among these olefinic monomers, we may mention limonene, terpenes, aromatic olefins such as styrene, alpha-methylstyrene, indene, coumarone, linear or cyclic olefins such as dicyclopentadiene.

The pyrolysis oil preferably comprises at least 70 wt % of carbon element, preferably at least 74 wt % and preferably at least 78 wt %.

The pyrolysis oil preferably comprises at most 5 wt % of nitrogen element, preferably at most 3 wt % and preferably at most 1.5 wt %.

The pyrolysis oil preferably comprises at most 2 wt % of sulphur element, preferably at most 1.5 wt % and preferably at most 1 wt %.

Step b) of Separation of the Pyrolysis Oil

The method according to the invention comprises a step of separation of the pyrolysis oil into at least one raffinate, an intermediate fraction and an extract, the intermediate fraction comprising from 10 wt % to 90 wt % of $C_4$-$C_{12}$ olefinic monomers and at most 10 wt % of heteroatoms.

"Extract" means a lighter fraction, i.e. whose final boiling point (or cut point according to the terminology used in distillation) is not as high as the initial point of the intermediate fraction. "Raffinate" means a heavier fraction, i.e. whose initial boiling point is higher than the final point of the intermediate fraction.

The olefinic monomers contained in the pyrolysis oil resulting from the pyrolysis step cannot be polymerized directly. In fact, on the one hand their concentration is too low, and on the other hand the oil comprises many constituents that may be detrimental to the proper operation of the resin synthesis step, in particular with respect to the activity of the catalyst.

Preferably, the intermediate fraction resulting from step b) is a cut whose boiling point at atmospheric pressure ranges from 140 to 280° C., preferably from 150 to 280° C. and preferably from 150 to 260° C. This cut concentrates most of the olefinic monomers of interest, while excluding most of the compounds that may have a negative impact on the resin synthesis step.

Said intermediate fraction comprises from 10 wt % to 90 wt % of $C_4$-$C_{12}$ olefinic monomers and at most 10 wt % of heteroatoms. In particular, it comprises limonene, other compounds of the terpenes family, such as α-pinene, β-pinene, carene, myrcene, farnesene, other terpenes whether or not oxidized, aromatic olefins such as styrene, alpha-methylstyrene, indene, coumarone, linear and cyclic olefins such as dicyclopentadiene, but also compounds that are inert with respect to the resin synthesis step such as aliphatic and aromatic hydrocarbons. Preferably, the separation step b) is carried out in such a way that the intermediate fraction comprises from 20 wt % to 80 wt % of $C_4$-$C_{12}$ olefinic monomers. The separation of an intermediate fraction by removal of an extract and a raffinate makes it possible to obtain, within this intermediate fraction, a content of inert compounds ranging from 10 wt % to 90 wt %, preferably from 20 wt % to 80 wt %. "Inert compounds" denotes, in the present text, compounds that do not react in the resin synthesis step, i.e. that do not become incorporated in the resin and that do not interact with the catalytic system. Said compounds are, in the context of the present document, mainly aliphatic and aromatic compounds, preferably aromatic and aliphatic hydrocarbon-containing compounds, preferably linear or cyclic aliphatic hydrocarbon-containing compounds, monoaromatic, unsubstituted or substituted with one or more alkyl groups, polyaromatic comprising from 2 to 5 aromatic rings. Said compounds that are inert with respect to the synthesis step preferably comprise predominantly organic compounds comprising from 8 to 10 carbon atoms, and preferably organic compounds comprising from 8 to 10 carbon atoms and an aromatic ring with 6 carbon atoms. Among these compounds that are inert with respect to the synthesis step, we may mention diethyl benzene, ethyl methyl benzene and o-cymene.

These inert compounds only include compounds that are not in the gaseous state in normal conditions of temperature and pressure, and therefore do not include in particular the inert gases, such as argon or nitrogen.

Preferably, the intermediate fraction resulting from step b) comprises at most 2 wt % of sulphur element, preferably at most 1.5 wt %, and preferably less than 1 wt %, very preferably less than 0.8 wt %, the latter being particularly detrimental to the subsequent resin synthesis step.

The step of separation of the pyrolysis oil into at least one raffinate, an intermediate fraction and an extract may be carried out by any means known by a person skilled in the art that makes it possible to increase the concentration of $C_4$-$C_{12}$ olefinic monomers and limit the content of heteroatoms.

In particular and preferably, the separation step b) is carried out by distillation, and the latter may be operated sequentially (batch) or continuously, in one or more intermediate steps.

Thus, in a preferred arrangement, the separation step b) is carried out by distillation, the intermediate fraction being obtained by topping followed by tailing.

"Topping" means removal of a light fraction, whose cut point is preferably below 140° C., preferably below 150° C. at atmospheric pressure. "Tailing" means removal of a heavy fraction, whose cut point is preferably above 280° C., preferably above 260° C.

In another preferred arrangement, the separation step b) is carried out by distillation, the intermediate fraction being obtained by tailing followed by topping.

In another preferred arrangement, the separation step b) is carried out in a single distillation step, the intermediate fraction being obtained by side draw-off from said distillation step. A particularly preferred example of implementation of this arrangement is implementation in a so-called "internal wall" column.

The raffinate, rich in polyaromatics, may be utilized for producing carbon black, for example by means of so-called "Blast furnace" processes, whose properties and specifications are comparable to those of the carbon black produced starting from conventional raw materials. It can be used for making new rubber products, such as tyres, conveyor belts or any rubber article.

The extract, with low content of compounds of interest for the resin synthesis step of the method according to the invention, may preferably be used as solvent, motor fuel, plasticizer or may be treated in refining processes in order to utilize the light aromatic hydrocarbons (benzene, toluene, xylenes).

In the preferred case where the separation step b) is carried out by distillation, the latter is preferably carried out at a pressure less than or equal to atmospheric pressure, preferably less than or equal to 0.5 bar, preferably less than or equal to 0.250 bar.

Preferably, the intermediate fraction resulting from step b) undergoes a purification treatment before being supplied to step c).

This purification treatment makes it possible, where applicable, in particular to lower the content of compounds such as sulphur or the carbonyl compounds before the intermediate fraction supplies a step c) of resin synthesis.

Preferably, the purification treatment is carried out by passing the intermediate fraction over a fixed bed of silica, alumina, activated carbon, ion-exchange resins or a mixture of these constituents.

In the arrangement in which the purification treatment is used, the content of heteroatoms in the intermediate fraction at the end of the purification treatment is below 2 wt %, preferably below 1 wt %, preferably below 0.9 wt % and preferably below 0.8 wt %.

Step c) of Resin Synthesis

The method according to the invention comprises a resin synthesis step comprising a polymerization section supplied at least with the intermediate fraction resulting from step b), followed by a finishing section producing a polymerized effluent.

The resin synthesis step consists mainly of oligomerizing the olefinic monomers contained in the intermediate fraction supplied to said synthesis step, and thus preparing new oligomeric materials of the resin type, by controlling the macrostructure, in particular by limiting the content of compounds of low molecular weight, such as monomers, dimers and trimers, and the compounds of high molecular weight, i.e. whose molecular weight is above 5000 g/mol, as well as the microstructure. Dimer means a compound comprising two monomers joined together by a covalent bond. A dimer may be a homodimer, i.e. a combination of two identical monomers, a heterodimer, i.e. a combination of two different monomers, or a mixture of a homodimer and a heterodimer. Trimer means a compound comprising three monomers joined together by a covalent bond. A trimer may be a homotrimer, i.e. a combination of three identical monomers, a heterotrimer, i.e. a combination of at least two different monomers, or a mixture of a homotrimer and a heterotrimer.

The resin synthesis step c) is not supplied with any additional supply of inert compounds external to the method, inert compounds to be understood in the sense of the present text as compounds that do not react in the resin synthesis step, i.e. that do not become incorporated in the resin and that do not interact with the catalytic system. Thus, step c) is supplied with the intermediate fraction resulting from step b), optionally by recycling the effluent rich in inert compounds resulting from treatment step d), without any additional supply, external to the method, of inert compounds in the sense of the present text.

Preferably, the resin obtained by the method according to the invention comprises less than 1 wt % of compounds whose molecular weight is above 5000 g/mol. Preferably, the resin obtained comprises at most 50 wt % of dimer and trimer compounds.

The polymerization section is operated in the absence of catalyst, or in the presence of an acid catalyst, of the Brönsted acid or Lewis acid type, and said catalyst may be homogeneous or heterogeneous. Preferably, said polymerization section is operated in the presence of an acid catalyst, of the Brönsted acid or Lewis acid type. Said polymerization section may also be operated in the presence of ligands, a co-catalyst, and/or an initiator of cationic polymerization, for example of the type that generates protons or carbocations.

Preferably, the catalyst is a Lewis acid comprising ligands of the aluminium halide family. Preferably, these ligands are selected from the chlorides of aluminium, for example aluminium trichloride, the chlorides of alkylaluminium, such as diethylaluminium chloride and ethylaluminium dichloride, and the chlorides of arylaluminium, such as phenylaluminium chloride. Preferably, the catalyst also comprises a co-ligand with Lewis base character, making it possible to modulate the acid character of the Lewis acid ligand, of the aliphatic ether type, for example diethyl ether, dibutyl ether, aromatic ether, for example diphenyl ether, or ester, for example ethyl acetate, or alkyl amines, for example triethyl amine or arylamines, for example diphenyl amine, triphenyl amine. The polymerization section may also be operated with ligands containing phosphorus, sulphur or any other heteroatom.

The particular operation of the separation step b) of the method according to the invention makes it possible to maintain, in the intermediate fraction, a sufficient quantity of inert compounds, in particular aliphatic and aromatic compounds, preferably aromatic and aliphatic hydrocarbon-containing compounds, preferably linear or cyclic aliphatic hydrocarbon-containing compounds, monoaromatic unsubstituted or substituted with one or more alkyl groups, polyaromatic comprising from 2 to 5 aromatic rings for carrying out the resin synthesis step without exogenous addition of inert compounds while maintaining good conversion and good selectivity, in particular through good control of the exothermic effect.

The polymerization section is preferably operated at a temperature from −60° C. to +300° C., preferably from −60° C. to +120° C., very preferably from −50° C. to +100° C., preferably from −40° C. to +90° C. and very preferably from +20 to +90° C.

The average residence time in the polymerization section is preferably between 0.25 h and 7 h, preferably between 0.5 h and 4 h. When the polymerization section is operated continuously, the average residence time in said section is the ratio of the reaction volume of said section to the sum of the volume flows of the feeds to the section.

The amount of catalyst, including the ligands and optional co-ligands, is preferably in a range from 0.05% to 5 wt % relative to the weight of $C_4$-$C_{12}$ olefinic monomers entering the polymerization section, and preferably ranges from 0.1% to 2 wt % relative to the weight of $C_4$-$C_{12}$ olefinic monomers entering the polymerization section.

The stream from the polymerization section is then treated in a finishing section, producing a polymerized effluent.

This finishing section makes it possible to stop the polymerization reaction by adding a compound that deactivates the catalyst and terminates the chains that are still growing. The finishing section is preferably operated by bringing into contact with a stream comprising a stopper compound selected from water, a $C_1$-$C_3$ alcohol and mixtures thereof, preferably selected from water, methanol, ethanol and mixtures thereof, very preferably water, at a temperature between 5 and 80° C., preferably at a temperature between 15 and 30° C. (for example at room temperature), followed by separation by phase decanting of a polymerized effluent and an effluent comprising predominantly the stopper compound.

The molar ratio of stopper compound to polymerization catalyst in the finishing section is at least equal to 1.1, preferably at least equal to 2.

When the stopper compound is water, the volume ratio of reaction mixture to water in the finishing section is preferably between 20:1 and 1:10, preferably between 10:1 and 1:5 and preferably between 5:1 and 1:1.

The stream from the polymerization section and the stream comprising the stopper compound are brought into contact, with stirring for a time preferably ranging from 5 min to 2 h, preferably from 15 min to 45 min, in order to promote contacting of the stopper compound with the reaction mixture.

At the end of this stirring step, a decanting step is carried out in order to separate on the one hand an organic phase making up the polymerized effluent and mainly containing the resins, the inert compounds, the unconverted monomers, dimers, trimers and oligomers with low molecular weights and a phase mainly containing the stopper compound, the catalyst residues and organic residues soluble in the stopper compound making up the effluent comprising predominantly the stopper compound.

The decanting step is preferably carried out for a time from 5 min to 4 h, preferably from 15 min to 2 h.

The effluent comprising predominantly the stopper compound may then be treated in order to recycle the stopper compound to the finishing section.

The polymerized effluent then supplies the treatment step.

Step d) of Treatment of the Polymerized Effluent

The method according to the invention comprises a step of treatment of the polymerized effluent resulting from step c) comprising a section for separation of an effluent rich in inert compounds and an effluent rich in resins, and a drying section supplied with the resin-rich effluent in order to produce the resins.

By carrying out the step of treatment of the polymerized effluent in the method according to the invention, it is possible to adjust the characteristics of the resins, in particular by removing the oligomers of low molecular weight (dimers, trimers, tetramers, for example) and by reducing the dispersity, in order to control the properties of the resins obtained.

The section for separation of an effluent rich in inert compounds and an effluent rich in resins makes it possible on the one hand to recover a majority of the inert compounds and of the unconverted monomers with a view to a subsequent use, preferably with a view to their recycling to the resin synthesis step of the method according to the invention, and on the other hand to concentrate the resins in the resin-rich effluent.

The separation section may be carried out by any method known by a person skilled in the art, in particular and preferably by evaporation, distillation, coagulation of the resins, liquid-liquid extraction or a combination of these methods.

In a preferred arrangement, the separation section is implemented by distillation in at least one distillation column so as to produce an effluent rich in inert compounds at the top and an effluent rich in resins at the bottom. This section makes it possible to remove the monomers and residual oligomers at the top as well as most of the inert compounds performing the role of solvent in the polymerization step used in the resin synthesis step and thus adjust the macrostructure of the resins as well as their properties, for example the glass transition temperature, designated Tg, in particular by reduction of dispersity by removing the compounds with low molecular weights. The effluent rich in resins comprises the majority of the resins supplied to the separation section. The resin recovery rate, corresponding to the ratio of the flow rate of resins in the resin-rich effluent to the flow rate of resins in the feed of the separation section, is preferably greater than 80%, preferably greater than 90%. This recovery rate may be adjusted by increasing the number of separation stages of the separation section, or by adjusting the operating parameters of said section, for example the reflux ratio.

In another preferred arrangement, the separation section is implemented by coagulation of the resins. In this arrangement, the polymerized effluent resulting from step c) is brought into contact with a coagulation solvent in which the resins are insoluble in order to precipitate the latter. The coagulation solvent dissolves the residual monomers, the inert compounds performing the role of solvent in the resin synthesis step and the oligomers of low molecular weight.

The coagulation solvent is preferably selected from the protic or aprotic polar solvents of low boiling point such as alcohols, for example methanol, ethanol and isopropanol, acetone, the ethers, for example tetrahydrofuran (designated THF) and dioxane.

The section for separation by coagulation is preferably operated with a volume ratio of coagulation solvent to medium to be coagulated from 1:1 to 10:1, preferably from 2:1 to 5:1. The section for separation by coagulation is preferably operated at a temperature from 5° C. to 40° C.

The stream comprising the coagulation solvent, making up the effluent rich in inert compounds, may then be recycled, for example to the resin synthesis step, undergoing beforehand, if necessary, a purification treatment step.

In another preferred arrangement, the separation section is implemented by liquid-liquid extraction. In this arrangement, the polymerized effluent resulting from step c) is washed with a stream comprising predominantly water. This extraction may be carried out in one or more steps, preferably in one to three steps.

The liquid-liquid extraction may also be carried out upstream of a resin separation by distillation or by coagulation as described above.

In another preferred arrangement, the separation section is implemented by evaporation, for example by evaporation in a scraped film evaporator.

The viscosity of the resin-rich effluent depends on the content of resins in this effluent and its temperature. These contents and temperatures are therefore adjusted so that this effluent can be transported to the drying section. We may try to maintain a high temperature in order to have a higher content of resins while maintaining a viscosity of the effluent allowing it to be conveyed, making sure to remain below the temperatures at which the resins degrade thermally.

The resin-rich effluent is then fed to a drying section in which it is filtered and then dried. At the end of the drying step, the dried resins have a residual content of inert compounds below 3 wt %, preferably below 1.5 wt % and preferably below 0.8 wt % relative to the weight of resins. The dried resins have a residual content of monomers below 5 wt %, preferably below 2 wt % and preferably below 1 wt % relative to the weight of resins.

The dried resins have a glass transition temperature (designated Tg) in the range from −50° C. to 180° C., preferably from 0 to 160° C., preferably from 20° C. to 140° C. They have a number-average molecular weight (designated Mn) less than or equal to 5000 g/mol, preferably less than or equal to 3000 g/mol, preferably below 1500 g/mol. They have a centrifugation-average molecular weight (designated Mz) less than or equal to 10000 g/mol, preferably less than or equal to 8000 g/mol, preferably below 6000 g/mol.

The glass transition temperature Tg is measured in a known manner by differential calorimetry, or DSC (Differential Scanning Calorimetry), for example and unless specified otherwise, according to standard ISO 11357-2 of 2014.

The dispersity index (designated PDI) of the dried resins is below 3, preferably below 2.5, preferably below 2.

The macrostructure (weight-average, number-average, and centrifugation-average molecular weight, and polydispersity index, designated Mw, Mn, Mz and PDI respectively) is determined by size-exclusion chromatography (SEC) as stated hereunder. Mz reflects the thermodynamic equilibrium between sedimentation and diffusion and depends on the size of the molecules. This higher-order average is used as an indication of the proportion of high molecular weights present in the sample.

As a reminder, SEC analysis consists for example of separating the macromolecules in solution according to their size through columns filled with a porous gel; the molecules are separated according to their hydrodynamic volume, the more voluminous ones being eluted first. The sample to be analysed is simply dissolved beforehand in a suitable solvent, tetrahydrofuran at a concentration of 1 g/litre. Then the solution is filtered on a filter with a porosity of 0.45 μm, before injection into the equipment at a flow rate of 1 ml/min and a temperature of 35° C. The equipment used is for example a "Waters Alliance" chromatographic chain.

Moore calibration is carried out with a series of commercial standard specimens of polystyrene of low PDI (below 1.2), of known molecular weights, covering the range of weights to be analysed. Mw, Mn, as well as PDI=Mw/Mn, are found from the data recorded (molecular weight distribution curve).

All the molecular weight values given in the present application therefore relate to calibration curves obtained with standard specimens of polystyrene.

The dried resins may then be formed by any method known by a person skilled in the art, depending on the subsequent use of said resins. This forming may for example be carried out by granulation.

The method according to the invention makes it possible, using specific conditions of pyrolysis and of separation of the pyrolysis oil obtained, to synthesize hydrocarbon-containing resins in a controlled manner, optimizing the recovery of compounds of interest in the rubber chips while limiting the species that could degrade the synthesis step. In this way, resins may be obtained having excellent performance starting from products resulting from recycling, reducing the environmental impact of the products using these resins.

DESCRIPTION OF THE FIGURES

FIG. 1 shows a schematic view of the method according to the invention.

A charge comprising rubber chips (1) is fed to a step (A) of pyrolysis of the rubber chips, giving a gaseous effluent (3), a pyrolysis oil (2) and a solid effluent (4). The pyrolysis oil (2) is fed to a step of separation of the pyrolysis oil (2) into at least one raffinate (7), an intermediate fraction (5) and an extract (6), the intermediate fraction (5) comprising at least 20 wt % of $C_4$-$C_{12}$ olefinic monomers and at most 10 wt % of heteroatoms. The intermediate fraction (5) is then fed to a resin synthesis step (C) comprising a polymerization section supplied at least with the intermediate fraction (5), preferably operated in the presence of an acid catalyst, followed by a finishing section producing a polymerized effluent (9). This polymerized effluent (9) is treated in a treatment step (D) comprising a section for separation of an effluent rich in inert compounds (11) and a resin-rich effluent (15), and a drying section supplied with the resin-rich effluent (15) in order to produce a stream of hydrocarbon-containing resins (10).

FIG. 2 shows a schematic view of the method according to the invention. The common elements with FIG. 1 are numbered identically.

A charge comprising rubber chips (1) is fed to a step (A) of pyrolysis of the rubber chips, giving a gaseous effluent (3), a pyrolysis oil (2) and a solid effluent (4). The pyrolysis oil (2) is fed to a step (B) of separation of the pyrolysis oil (2) into at least one raffinate (7), an intermediate fraction (5) and an extract (6), the intermediate fraction (5) comprising at least 20 wt % of $C_4$-$C_{12}$ olefinic monomers and at most 10 wt % of heteroatoms. The intermediate fraction (5) is purified in an optional purification step (P1) and is then fed to a resin synthesis step (C) comprising a polymerization section ($C_1$), operated in the presence of an acid catalyst so as to produce a stream from the polymerization section (12), this stream being fed to a finishing section ($C_2$) producing a polymerized effluent (9). The finishing section ($C_2$) is also supplied with a stream comprising a stopper compound (13) and produces an effluent comprising predominantly the stopper compound (14). The polymerized effluent (9) is treated in a treatment step (D) in which it is fed to a section for separation (D1) of a solvent-rich effluent (11) and a resin-rich effluent (15), the latter being fed to a drying section (D2) that produces a stream of hydrocarbon-containing resins (10). The solvent-rich effluent (11) may be fed to an optional purification treatment (P2) in order to be reused in the method according to the invention.

EXAMPLE

An implementation of the method according to the invention is described hereunder.
Pyrolysis Step A step for pyrolysis of rubber chips is supplied with chips having an average diameter of about 1 mm and a density of 504 kg/m³, resulting from the grinding of tyres of heavy goods vehicles of all dimensions and many brands. These chips have a content of isoprene elastomers of 65 wt %.

The pyrolysis step is carried out under an inert atmosphere of nitrogen, in a reactor comprising 3 sections operated at respective temperatures of 425° C., 550° C. and 775° C., therefore having an increasing temperature profile.

A gaseous effluent, a pyrolysis oil and a liquid effluent are separated at reactor outlet with the following respective yields (effluent flow rate/feed flow rate): 13.5%, 44.5% and 42%. The pyrolysis oil comprises about 4 wt % of several monomers of interest, including styrene, methylstyrene, indene, beta-pinene and limonene.

Step of Separation of the Pyrolysis Oil

The pyrolysis oil is fed to a step of separation by distillation carried out in two sections at atmospheric pressure. In a first section, a light cut is separated, whose initial boiling point is below 160° C., constituting the extract. The heavier fraction is fed to a second section for producing a raffinate whose cut point is 280° C., i.e. whose initial boiling point is 280° C. at atmospheric pressure, and an intermediate cut constituting the intermediate fraction. The content of olefinic monomers in this fraction is about 33 wt %, including 24.3 wt % of limonene, 2.8 wt % of styrene and 3 wt % of indene. The content of inert compounds in the intermediate fraction is 65 wt %. These inert compounds comprise linear and cyclic aliphatic compounds, such as 1,2-dimethylcyclopropane, trimethylpentane, monoaromatic compounds such as benzene, toluene, ethylbenzene, xylenes, polyaromatic compounds such as naphthalene and substituted derivatives, anthracenes and substituted derivatives and isomers (phenanthrenes), phenyl-naphthalenes and substituted derivatives, pyrenes. The ratio of aliphatic to aromatic compounds in the inert compounds is about 1:2.
Resin Synthesis Step The intermediate fraction is fed to a resin synthesis step. Aluminium chloride (2 mol % relative to the content of monomers) is introduced into a reactor under an inert atmosphere. The reactor is then kept under inert atmosphere throughout the reaction.

The intermediate fraction is then injected into the reactor. The mixture is stirred at a temperature of 25° C. for 2 h. The reaction is then stopped by adding water.

The reaction mixture, constituting the polymerized effluent, is separated into an effluent rich in inert compounds and an effluent rich in resins by washing with water and coagulation of the resins with methanol. The resin-rich effluent is then dried in a stove at 175° C. for 24 h. A resin is recovered in the form of a yellow/orange translucent solid having a number-average molecular weight $Mn=720$ g/mol, a polydispersity index $PDI=1.4$ and a glass transition temperature $Tg=50°$ C.

The invention claimed is:

1. A method of producing hydrocarbon-containing resins starting from a charge comprising rubber chips, the method comprising:
    (a) pyrolyzing the rubber chips at a temperature between 300 and 900° C. with an increasing temperature ramp to produce a gaseous effluent, a pyrolysis oil and a solid effluent, the pyrolysis oil comprising at least 1.5 wt % C4-C12 olefinic monomers;
    (b) separating the pyrolysis oil into at least one raffinate, an intermediate fraction and an extract, the intermediate fraction comprising 10 to 90 wt % C4-C12 olefinic monomers, 20 to 80 wt % inert compounds, and at most 10 wt % heteroatoms;
    (c) polymerizing the intermediate fraction to produce a first effluent stream;
    (d) stopping the polymerization by contacting the first effluent stream with a stopper compound to produce a polymerized effluent stream;
    (e) separating the polymerized effluent stream into an effluent rich in inert compounds and an effluent rich in resins; and
    (f) drying the effluent rich in resins to produce a stream comprising the hydrocarbon-containing resins,
        wherein no inert compounds are externally supplied during the method of production of hydrocarbon-containing resins.

2. The method according to claim 1, wherein the rubber chips have a longest length in a range from 1 to 100 mm.

3. The method according to claim 1, wherein the rubber chips comprise at least 50 phr of diene elastomer.

4. The method according to claim 3, wherein the diene elastomer is selected from the group consisting of natural rubber, synthetic polyisoprenes, polybutadienes, butadiene copolymers, isoprene copolymers and mixtures thereof.

5. The method according to claim 1, wherein step (a) comprises operating a pyrolysis reactor at a temperature between 35° and 800° C., a pressure below 1 bar, and a ratio of residence time of the rubber chips to residence time of the gaseous effluent from 10 to 240.

6. The method according to claim 1, wherein the temperature ramp is between 1 and 10° C./min.

7. The method according to claim 1, wherein the intermediate fraction comprises at most 2 wt % of sulfur element.

8. The method according to claim 1, wherein step (b) is carried out by distillation.

9. The method according to claim 8, wherein step (b) is carried out in a column with an internal wall, the intermediate fraction being obtained by side-stream draw-off from the column.

10. The method according to claim 1, wherein the intermediate fraction undergoes a purification treatment before supplying step (c).

11. The method according to claim 10, wherein a content of heteroatoms in the intermediate fraction at the end of the purification treatment is below 2 wt %.

12. The method according to claim 1, wherein step (c) is carried out in presence of an acid catalyst.

13. The method according to claim 1, wherein step (d) is carried out at a temperature between 5 and 80° C., wherein the stopper compound is selected from water, a $C_1$-$C_3$ alcohol and mixtures thereof, and wherein the stopping is followed by phase decanting to produce the polymerized effluent stream and an effluent comprising predominantly the stopper compound.

\* \* \* \* \*